L. TAYLOR.
RANGE FINDER.
APPLICATION FILED JUNE 15, 1905.

903,915.

Patented Nov. 17, 1908.
3 SHEETS—SHEET 1.

WITNESSES:
INVENTOR
Lowndes Taylor
BY
ATTORNEY.

L. TAYLOR.
RANGE FINDER.
APPLICATION FILED JUNE 15, 1905.
903,915.
Patented Nov. 17, 1908.
3 SHEETS—SHEET 2.
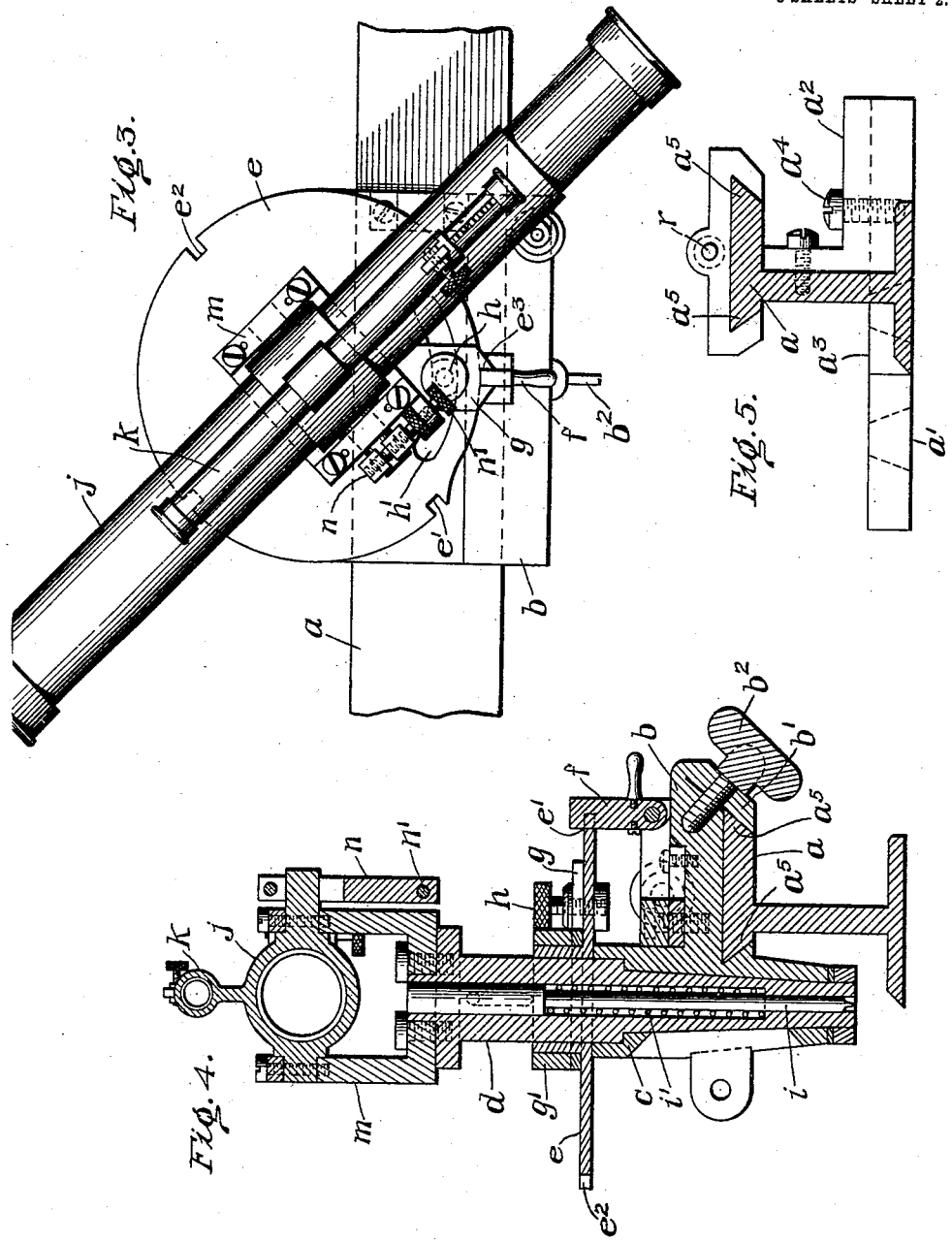

L. TAYLOR.
RANGE FINDER.
APPLICATION FILED JUNE 15, 1905.
903,915.
Patented Nov. 17, 1908.
3 SHEETS—SHEET 3.
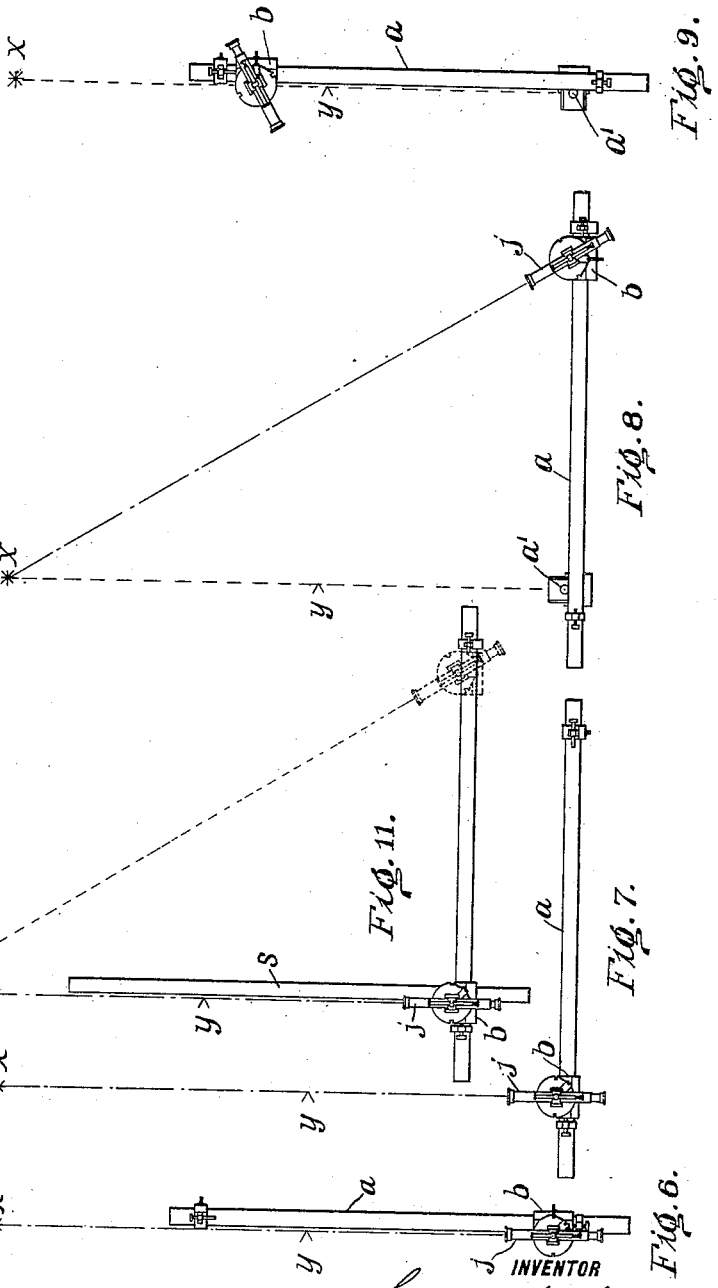
WITNESSES:
D. Webster Jr.
Wm. Rooney.
INVENTOR
Landes Taylor
BY
ATTORNEY.

UNITED STATES PATENT OFFICE.

LOWNDES TAYLOR, OF WEST CHESTER, PENNSYLVANIA.

RANGE-FINDER.

No. 903,915.     Specification of Letters Patent.     Patented Nov. 17, 1908.

Application filed June 15, 1905. Serial No. 265,445.

*To all whom it may concern:*

Be it known that I, LOWNDES TAYLOR, of West Chester, county of Chester, and State of Pennsylvania, have invented an Improvement in Range-Finders, of which the following is a specification.

This invention relates to an instrument for the use of surveyors, military &c. for easily, quickly and accurately finding and plotting the range of distant objects.

My instrument is based on the well known law that the relative distances of objects each viewed from two different points at relatively like angles of observation are proportional to the distances between the two points of observation for each, and it is my object to thus enable the range of distant objects to be measured and plotted within very wide limits.

It is also an object of my invention to render one instrument available for measuring both relatively close and relatively distant ranges, by a mere adjustment of the relative angles of observation, and without the necessity of changing the base line.

The scale of the base line varies with the angles of observation, but with my instrument it is not necessary to use a graduated scale for one predetermined angle of observation though such graduations may of course be used when desired. The distances may be read from the base line or may be plotted on an independent record sheet from which the real distance may be ascertained from a chart or scale prepared from measured or known distances for the particular angle of observation used, and consequently the same instrument with the same base line may be used for different angles of observation according to the range of the distances to be measured. With the same angles of observation the relative distances of a number of objects may be accurately read and also plotted as the indicated distances will be proportional to the actual distances.

Figure 1:
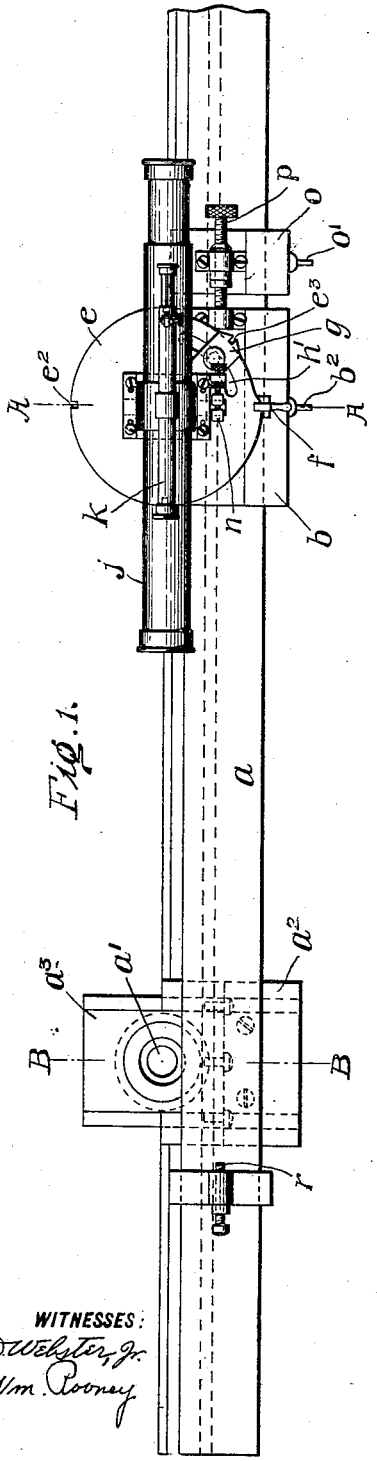
Figure 2:
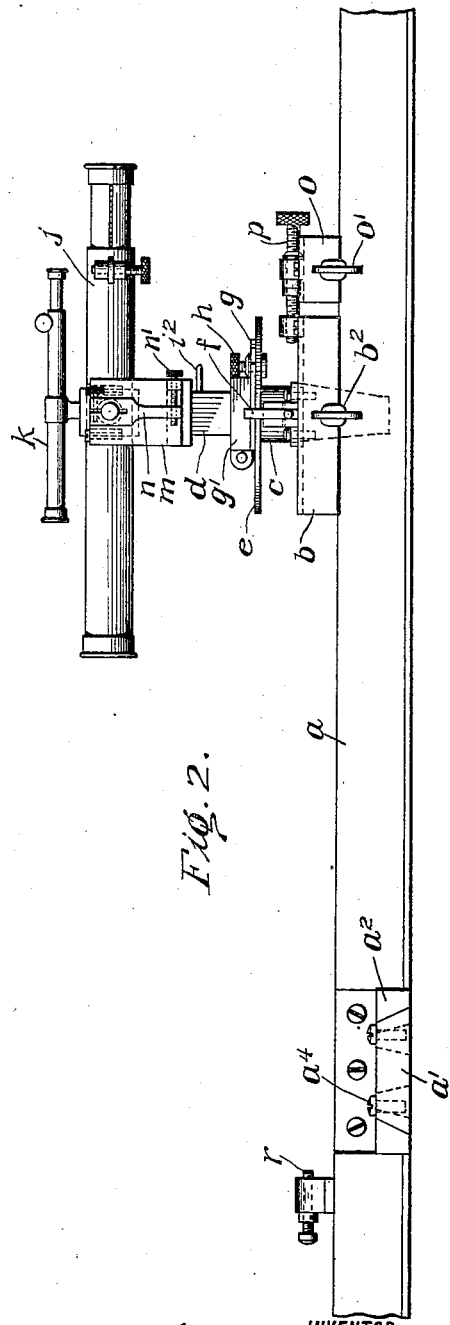

In the drawings:—Figure 1 is a plan view of the instrument with the sighting instruments turned longitudinally to the bar; Fig. 2 is a side elevation of the same; Fig. 3 is an enlarged plan view of the telescope and carrier showing the former turned into angular sighting position; Fig. 4 is an enlarged transverse vertical section on the line A—A of Fig. 1; Fig. 5 is a transverse vertical section enlarged on the line B—B of Fig. 1; Figs. 6, 7, 8 and 9 are diagrams illustrative of the use of the instrument showing different positions assumed by the pivoted bar and telescopes; Fig. 10 is a plan view on a reduced scale showing a modified form of the instrument in which two sets of telescopes are used; and Fig. 11 is a similar view showing another modification.

$a$ is a bar pivoted near one end as at $a'$ to the table or board or otherwise held so as to rotate in a horizontal plane. In the construction shown the bar carries a transverse rabbeted plate $a^2$ which engages a pivot plate $a^3$, whereby the bar may be adjusted transversely to the pivot plate in assembling the parts. When the parts are assembled and adjusted the plate $a^2$ is secured to the pivot plate, as by screws $a^4$, and the bar may then swing on the pivot $a'$.

The bar $a$ is provided with suitable guides $a^5$ on which is mounted a slide $b$ which may be moved longitudinally, and is provided with suitable means for securing it in adjusted position. As shown the slide $b$ is provided with a spring edge $b'$ which carries a thumb screw $b^2$ by which said spring edge may be clamped.

Carried by the slide $b$ is an upright tubular sleeve $c$, in which is journaled an upright spindle $d$ which carries the sighting instruments or telescopes. Carried by this spindle $d$ and turning with it, is a horizontal disk $e$ having peripheral notches as $e'$ $e^2$ which as shown are two in number and arranged diametrically opposite to one another. In some cases additional peripheral notches will be employed.

$f$ is a pivoted dog or catch carried by the slide $b$ and adapted to engage any of the notches $e'$ $e^2$ &c. The movement of the disk $e$ to change the engagement with the catch $f$ of one of the notches $e'$, $e^2$ &c. to the other will be through 90°, and the notches are so disposed with reference to the sighting instruments or telescopes that when one notch, as $e'$, is in engagement with the catch the sighting instruments will lie longitudinally to the bar as in Figs. 1, 2 and 6, and when the other, as $e^2$, is engaged they will lie transversely at right angles to the bar, as in Fig. 7. Other angles may, however be used.

In addition to the fixed notches $e'$ $e^2$ and between them there is an additional adjustable notch $e^3$, which, when engaged by the catch $f$ will cause the sighting instruments to assume an intermediate angular position as in Figs. 3, 8 and 9. It is desirable that this angular position should be changeable, and therefore the notch $e^3$ is made adjustable. For this purpose the notch is shown formed in a plate $g$ having an eye fitting upon the flange of the disk $e$ and is secured in adjusted position by a set screw $h$ engaging a slot $h'$ in the disk.

$g'$ is a clamping collar surrounding the flange of the disk above the eye of the plate $g$ to secure the parts together. By adjusting the plate $g$ with its notch $e^3$, the sighting instruments may be made to assume any intermediate angle.

Arranged within the spindle is a needle or pencil $i$ normally elevated by a spring $i'$ and provided with a pin $i^2$ projecting through a slot in the shaft $d$ by which the needle may be depressed to cause its point to make a mark in the recording paper.

The sighting instruments, which as shown consist of a long range telescope $j$ and a short range telescope $k$ arranged above the former, are pivoted in a housing $m$ mounted on the top of the spindle $d$. They may be adjusted to vary their vertical inclination by the usual arm $n$ carried by the projected trunnion of the telescope $j$ and moved by a micrometer screw $n'$ on the housing.

As an accurate longitudinal adjustment of the slide $b$ cannot be secured by simple hand movement, the auxiliary adjusting slide $o$ may be employed. This is a slide movable on the bar $a$ and adapted to be secured thereto by a clamping screw $o'$, and is connected with the slide $b$ by a micrometer screw $p$. When the screws $b^2$ and $o'$ are loosened the slides are moved by hand as nearly as possible into the desired position. The slide $o$ is then clamped and the slide $b$ is adjusted by the screw $p$ until the exact position is ascertained and it is then clamped by the screw $b^2$.

$r$ is an adjustable limit stop on the bar adjacent to the pivot $a'$ to limit the inward movement of the slide and sighting instruments.

This instrument is based upon the recognized law that if an object is viewed from two different positions the distance between the two lines of vision will be proportional to the distance of the object from the observer, i. e. it will be expressed by the length of the base line between the two lines of observation. If one point of observation is constant, and the angle of the second point of observation is also constant, it follows that the distance between the two points of observation will vary directly as the distance of the object. The bar $a$ constitutes the base line and for given angles of observations the relative distances on the bar will express the relative distances of the objects. The actual distance may be ascertained from a scale laid out from measured distances for the given angles. These scales will vary with the angles used.

As shown in the drawings the first or constant point of observation is directly over the pivot point, the sighting instrument then being parallel to or at right angles to the bar $a$, and the angle of the second or variable point of observation is approximately at 45°. The sighting instruments are first turned in a direction longitudinal to the bar and are then brought in range with object $x$ the distance of which is to be measured. The bar will then occupy the position shown in Fig. 6 in direct line with the object. The observer then marks on the paper placed beneath the instrument a point $y$ which determines the direction line of the object with reference to the first observation. The telescope is then turned at right angles to the bar $a$ and the object is again sighted. Consequently when the telescope, still at the pivot point $a'$, is in range with the object, the bar $a$ will assume a position exactly at right angles (that being the angle selected for the convenience). This position is shown in Fig. 7. The bar is then clamped or fixed securely in this position, and the observer turns the telescope to an angle determined for the second observation (45° in the case illustrated) and moves it longitudinally on the bar $a$ until it is in range with the object. In this position it is clamped to the bar. It is then as shown in Fig. 8. The bar $a$ is then unclamped and is revolved back to the original position touching the direction mark $y$, as shown in Fig. 9. The needle $i$ is then depressed and a mark will be made on the paper or recording sheet distant from the pivot point $a$ exactly the distance of the second angular observation from the first observation, and this distance will express the distance of the object according to the predetermined scale.

The proper angle of the second observations with reference to the first will depend upon the general average of distance of the objects. Thus a given angle will be suited for making observations within a certain average range of distances, but will be unsuited for greater or less distances. The greater general average of the distances within the range the less acute must the angle be to the line of the bar $a$. Therefore to render the instrument suitable for practically all measurable distances the angle of the second observation is made adjustable. But any change in the relative angles of observation will correspondingly change the scale, and therefore there may be prepared— by experiment with measured distances—a set of scales for each angle of observation. The observer therefore having determined the distance of the point of the second observation from the pivot point, may ascertain the real distance of the object from the scale for the used angle of the second observation. By proper graduations in circular measure on the disk $e$ the angle of second observation determined by the position of the notch $e^3$ may be ascertained for the scale chosen.

It is not necessary that the same sighting instruments should be used for both observations; in Fig. 10 I have shown two sighting instruments, one $j$, $k$, for making the first observation and determining the direction line, and the second, $j'$, $k'$, for making the second or angular observation.

The instrument may be used for measuring, determining or plotting peripheral distances as well as plane distances. For long distances the curvature of the earth's surface may be taken into consideration, and a scale may be prepared from measured or known distances to express the actual distances in peripheral measure. Consequently the distance of the second sighting position of the instrument may be translated into the actual peripheral distance.

It is not necessary to turn the bar $a$ back to the direction point $y$ as shown in Fig. 9 for the purpose of plotting the position of the object, as the same result may be accomplished by turning the paper under the instrument until the point $y$ is brought to the bar.

The same general results may be accomplished by the use of an auxiliary bar $s$ connected with the bar $a$ at an angle as shown in Fig. 11. In such case after the second observation has been made the distance indicated in the bar $a$ may be set off on the bar $s$.

Where the distance of the object necessitates a longer base line the bar $a$ may be extended or divided into parts, the first observation being made from the first part and the second observation from the second part. As such two parts would be in the same angular position, they would be the equivalent of an elongated bar, with the unnecessary intermediate portion omitted.

What I claim as new and desire to secure by Letters Patent, is as follows:

1. In a range finder, the combination of a pivoted bar, a sighting instrument carried thereby and movable longitudinally thereon and having provision for horizontal angular adjustment with reference thereto, and provided with stops for determining two fixed points of angular adjustment, and an adjustable stop for determining a variable point of angular adjustment between said fixed points.

2. In a range finder, the combination of a pivoted bar, a sighting instrument carried thereby and movable longitudinally thereon and having provision for horizontal angular adjustment, and an adjustable stop for determining a variable point of such angular adjustment.

3. In a range finder, the combination of a pivoted bar and a sighting instrument carried thereby, said bar being adapted to be moved horizontally into parallelism with the sighting instrument when said instrument is sighting the object, whereby said bar will indicate the direction of the object in said sighting position and enable the same to be recorded.

4. In a range finder, the combination of a pivoted bar, a slide movable longitudinally thereon, a sighting instrument carried by said slide on a vertical axis and adjustable thereon to vary its horizontal angular position with reference to said bar, and means to lock said sighting instrument at two predetermined fixed points in its adjusted angular position.

5. In a range finder, the combination of a pivoted bar, a slide movable longitudinally thereon, a sighting instrument carried by said slide on a vertical axis and adjustable thereon to vary its horizontal angular position with reference to said bar, and means to lock said sighting instrument at two fixed points in its adjusted angular position, and an adjustable stop to lock said sighting instrument at a variable angular position of adjustment between said fixed points.

6. In a range finder, the combination of a pivoted bar, a slide movable longitudinally thereon, a sighting instrument carried by said slide on a vertical axis and adjustable thereon to vary its horizontal angular position with reference to said bar, and provided with stops moving with said sighting instrument to determine its position of angular adjustment, and a catch carried by said slide and adapted to engage said stops.

7. In a range finder, the combination of a pivoted bar, a slide movable longitudinally thereon, a sighting instrument carried by said slide on a vertical axis and adjustable thereon to vary its horizontal angular position with reference to said bar, an adjustable stop moving with said sighting instrument to determine its position of angular adjustment, and a catch device to engage said stop.

8. In a range finder, the combination of a pivoted bar, a slide movable longitudinally thereon, a sighting instrument carried by said slide on a vertical axis and adjustable thereon to vary its horizontal angular position with reference to said bar, a horizontal disk carried with said sighting instrument and having relatively fixed stops to determine predetermined fixed positions of angular adjustment, and a catch device to engage said stops.

9. In a range finder, the combination of a pivoted bar, a slide movable longitudinally thereon, a sighting instrument carried by said slide on a vertical axis and adjustable thereon to vary its horizontal angular position with reference to said bar, a horizontal disk carried with said sighting instrument and having relatively fixed stops to determine fixed positions of angular adjustment, a relatively adjustable stop between said fixed stops to determine a variable position of angular adjustment, and a catch device to engage said stops.

10. In a range finder, the combination of a pivoted bar, a sighting instrument carried thereby and movable longitudinally thereon, means to adjust the horizontal angular position of said sighting instrument on the bar, and a movable marking device carried with said sighting instrument and adapted when operated to make a mark to indicate the position of longitudinal adjustment of said sighting instrument on the bar.

11. In a range finder, the combination of a pivoted bar, a sighting instrument carried thereby, a sighting instrument carried thereby and movable longitudinally thereon, means to adjust the horizontal angular position of said sighting instrument on the bar, and a movable marking device consisting of a vertical spring pressed needle carried with said sighting instrument and adapted when operated to make a mark to indicate the position of longitudinal adjustment of said sighting instrument on the bar.

12. In a range finder, the combination of a pivoted bar and a sighting instrument carried thereby and movable longitudinally thereon with provision for horizontal angular adjustment, said bar being free to occupy a position in the direction line of the object when sighted by the sighting instrument in one position and to be turned to an angle to said direction line when the sighting instrument is moved into the other position of sighting, and a movable marking device moving with said sighting instrument and adapted to make a mark to indicate the position of said instrument on the bar when in such other sighting position.

13. In a range finder, the combination of a pivoted frame, a sighting instrument carried thereby and movable longitudinally thereon, and a movable marking device moving with said sighting instrument and adapted to be operated to make a mark indicating its position and the position of the sighting instrument on the frame.

14. In a range finder, the combination of a longitudinal guide, a sighting instrument carried thereby and movable longitudinally thereon, and a movable marking device moving with said sighting instrument and adapted to be operated to make a mark to indicate the positions of said sighting instrument on said guide.

In testimony of which invention, I hereunto set my hand.

LOWNDES TAYLOR.

Witnesses:
GIBBONS GRAY CANTWELL,
MINERVA H. HAZZARD.